(12) United States Patent
Son

(10) Patent No.: US 10,244,150 B2
(45) Date of Patent: Mar. 26, 2019

(54) METHOD AND APPARATUS FOR CAPTURING AN IMAGE OF AN OBJECT BY TRACKING THE OBJECT

(71) Applicant: SAMSUNG ELECTRONICS CO., LTD., Suwon-si (KR)

(72) Inventor: BongKi Son, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 15/210,258

(22) Filed: Jul. 14, 2016

(65) Prior Publication Data
US 2017/0155805 A1 Jun. 1, 2017

(30) Foreign Application Priority Data
Nov. 26, 2015 (KR) .......................... 10-2015-0166461

(51) Int. Cl.
*H04N 5/225* (2006.01)
*G06T 7/20* (2017.01)
*G06T 7/00* (2017.01)
*H04N 5/232* (2006.01)

(52) U.S. Cl.
CPC .......... *H04N 5/2251* (2013.01); *G06T 7/004* (2013.01); *G06T 7/20* (2013.01); *H04N 5/23293* (2013.01); *G06T 2207/10024* (2013.01); *G06T 2207/10028* (2013.01); *H04N 5/2257* (2013.01)

(58) Field of Classification Search
CPC ............................... G03B 15/16; H04N 13/279

USPC ........................................................ 348/169
See application file for complete search history.

(56) References Cited

U.S. PATENT DOCUMENTS

| | | | | |
|---|---|---|---|---|
| 6,411,332 B1* | 6/2002 | Whitby | ............... | H04N 5/2251 348/373 |
| 8,174,580 B2* | 5/2012 | Hayashi | ................. | H04N 5/232 348/169 |
| 9,482,530 B2* | 11/2016 | Norman | ............... | G02B 27/644 |
| 2004/0100563 A1* | 5/2004 | Sablak | .................... | H04N 7/183 348/211.4 |
| 2005/0029458 A1* | 2/2005 | Geng | ............... | G08B 13/19608 250/347 |
| 2008/0055413 A1* | 3/2008 | Hayashi | ................. | H04N 5/232 348/169 |
| 2009/0304374 A1* | 12/2009 | Fruehauf | ............... | G01S 5/0284 396/153 |
| 2010/0194849 A1* | 8/2010 | Bruno | .................... | H04N 7/142 348/14.16 |
| 2011/0157301 A1* | 6/2011 | Saitou | ................ | H04N 5/23238 348/36 |
| 2014/0002691 A1* | 1/2014 | Masugi | ............. | H04N 5/23293 348/223.1 |

(Continued)

FOREIGN PATENT DOCUMENTS

| | | |
|---|---|---|
| JP | 2006-352540 A | 12/2006 |
| JP | 2013-12930 A | 1/2013 |

(Continued)

*Primary Examiner* — Paulos M Natnael
(74) *Attorney, Agent, or Firm* — Sughrue Mion, PLLC

(57) ABSTRACT

An apparatus for capturing an image includes a body; an image capturing device configured to capture an image; and a connector configured to rotatably connect the image capturing device to the body and rotate the image capturing device based on position information of an object.

21 Claims, 9 Drawing Sheets

(56) References Cited

U.S. PATENT DOCUMENTS

| | | | |
|---|---|---|---|
| 2016/0014921 A1* | 1/2016 | Francois | H05K 5/0234 |
| | | | 361/807 |
| 2016/0073006 A1* | 3/2016 | Funamoto | H04N 5/23212 |
| | | | 348/345 |
| 2017/0026574 A1* | 1/2017 | Kwon | H04N 5/23238 |
| 2017/0064201 A1* | 3/2017 | Tsuchiya | H04N 5/23229 |
| 2017/0064289 A1* | 3/2017 | Lo | G06F 1/1643 |
| 2017/0215766 A1* | 8/2017 | Fernandez Prada | |
| | | | A61B 5/0015 |
| 2017/0330332 A1* | 11/2017 | Choi | G06T 7/215 |

FOREIGN PATENT DOCUMENTS

| | | |
|---|---|---|
| KR | 20-0224061 Y1 | 5/2001 |
| KR | 10-2009-0036734 A | 4/2009 |
| KR | 10-2012-0008806 A | 2/2012 |
| KR | 10-2013-0072748 A | 7/2013 |

\* cited by examiner

METHOD AND APPARATUS FOR CAPTURING AN IMAGE OF AN OBJECT BY TRACKING THE OBJECT

CROSS-REFERENCE TO RELATED APPLICATION

This application claims priority from Korean Patent Application No. 10-2015-0166461, filed on Nov. 26, 2015 in the Korean Intellectual Property Office, the disclosure of which is incorporated herein in its entirety by reference.

BACKGROUND

1. Field

Methods and apparatuses consistent with exemplary embodiments relate to a method and an apparatus for capturing an image of an object by tracking the object.

2. Description of the Related Art

A digital image capturing device may receive an image captured by a capturing element, process the image in a digital signal processor, generate an image file by compressing the image, and store the image file in a memory. Recently, a mobile terminal such as a smartphone may also include a function of the digital image capturing device.

The digital image capturing device may display an image received through the capturing element or an image of an image file stored in a storage on a display device such as a liquid crystal display (LCD). When a target object of a user is not included in the image, the user may capture the target object by moving the digital image capturing device.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an apparatus for capturing an image, the apparatus including: a body; an image capturing device configured to capture an image; and a connector configured to rotatably connect the image capturing device to the body and rotate the image capturing device based on position information of an object.

The image capturing device may include a motion sensor configured to detect a position of the object relative to the apparatus and generate the position information.

The motion sensor may include an image sensor configured to capture at least one of a color image, a black and white image, a depth image, and an event image; a signal processor configured to perform an image processing on the captured image; and a position information determiner configured to generate the position information based on the image on which the image processing is performed.

The image capturing device may track a movement of the object by analyzing the captured image, and generate the position information based on the tracked movement.

The connector may rotate the image capturing device based on the position information such that an orientation of a focus of the image capturing device is towards the object.

The connector may rotate the image capturing device automatically or in response to a user input.

The connector may rotate the image capturing device such that, when an image including the object is captured, the object is positioned in a predetermined region of the captured image including the object.

The connector may have a mechanical structure having at least two rotation axes to three-dimensionally rotate the image capturing device.

The connector may include a rotation determiner configured to determine whether to rotate the image capturing device based on the position information; a driver interface configured to control a rotational motor based on a result of determination of the rotation information; and the rotational motor configured to rotate the image capturing device under a control of the driver interface.

The connector may rotate the image capturing device by 360 degrees based on a yaw axis when an input to generate a panorama image is received, and the image capturing device may generate the panorama image based on an image captured while rotating based on the yaw axis.

According to an aspect of another exemplary embodiment, there is provided a method of capturing an image by using an image capturing apparatus, the method including: capturing an image of an area by using an image capturing device rotatably connected to a body of the image capturing apparatus; and rotating the image capturing device based on position information of an object.

The method may further include generating the position information by detecting a position of the object relative to the image capturing apparatus.

The generating may include capturing at least one of a color image, a black and white image, a depth image, and an event image; performing an image processing on the captured image; and generating the position information based on an image obtained through the image processing.

The capturing may include tracking a movement of the object by analyzing the captured image; and generating the position information based on the tracked movement.

The rotating may include rotating the image capturing device based on the position information such that an orientation of a focus of the image capturing device is towards the object.

When at least one object is present, the rotating may include selecting a certain object from the at least one object; and rotating the image capturing device based on position information of the selected object such that an orientation of a focus of the image capturing device is towards the selected object.

The rotating may include rotating the image capturing device such that, when an image including the object is captured, the object is positioned in a predetermined region of the captured image including the object.

The rotating may include three-dimensionally rotating the image capturing device by using a mechanical structure having at least two rotation axes.

The rotating may include determining rotation information of the image capturing device based on the position information; and controlling a rotational motor to be driven based on the rotation information.

According to an aspect of still another exemplary embodiment, there is provided a non-transitory computer-readable storage medium storing a program which, when executed by a computer, causes the computer to implement the above method.

According to an aspect of still another exemplary embodiment, there is provided an apparatus for capturing an image, the apparatus including: a camera; and a controller configured to detect a position of an object relative to the apparatus and control a position of the camera based on the position of the object.

The camera may be rotatably connected to a body of the apparatus, and the controller may rotate the camera based on the position of the object such that an orientation of a focus of the camera is towards the object.

The apparatus may further include a motor configured to rotate the camera under a control of the controller.

The controller may detect the position of the object by analyzing an image of the object captured by the camera.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
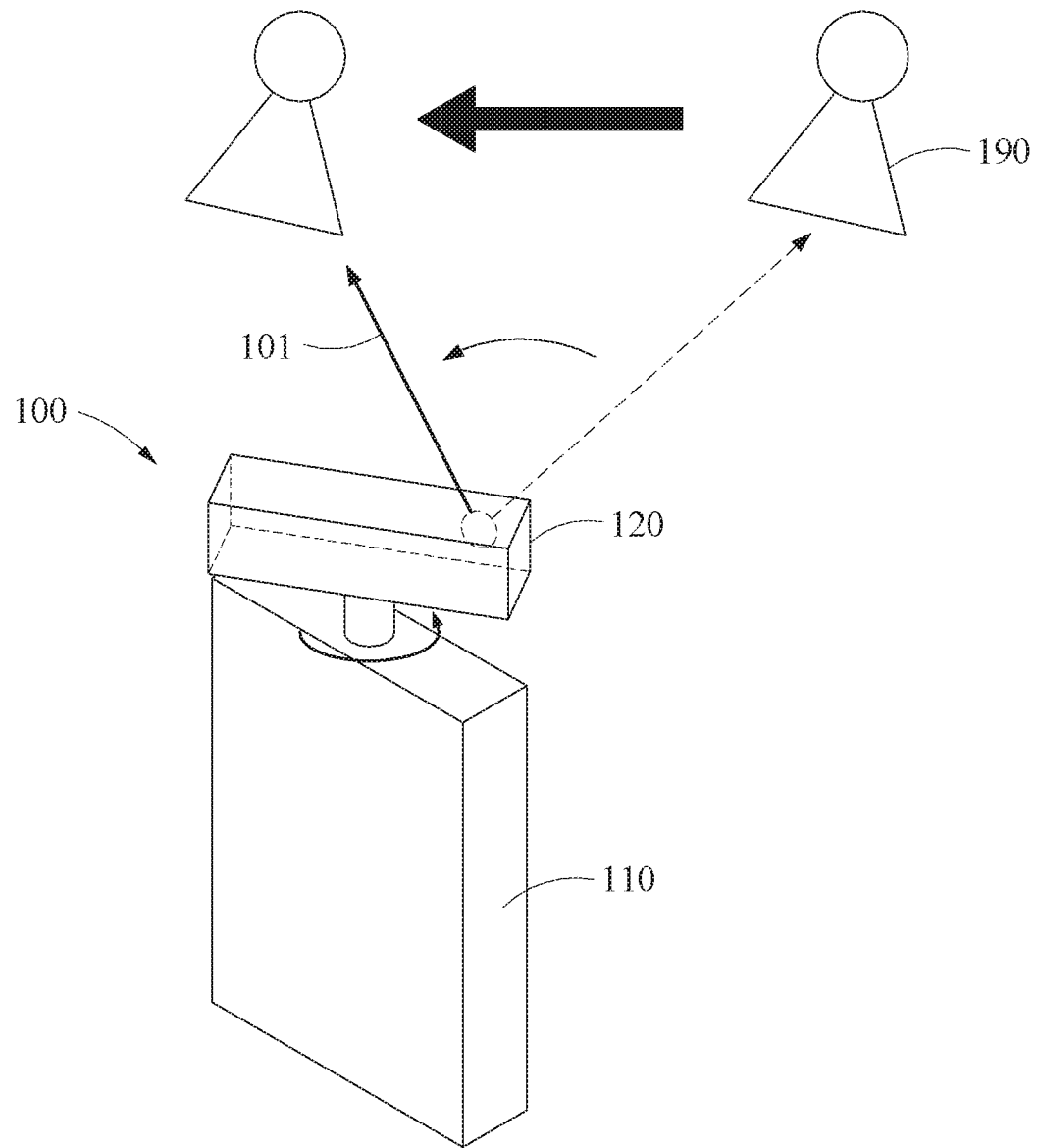
FIG. 1 is a diagram illustrating an example of an apparatus for receiving an image by tracking an object according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In addition, the terms such as "unit", "-er (-or)", and "module" described in the specification refer to an element for performing at least one function or operation, and may be implemented in hardware, software, or the combination of hardware and software.

In the following description, like drawing reference numerals are used for like elements, even in different drawings. Various alterations and modifications may be made to the exemplary embodiments, some of which will be illustrated in detail in the drawings and detailed description. The matters defined in the description, such as detailed construction and elements, are provided to assist in a comprehensive understanding of the exemplary embodiments. However, it should be understood that these embodiments are not construed as limited to the illustrated forms and include all changes, equivalents or alternatives within the idea and the technical scope of this disclosure. It is apparent that the exemplary embodiments can be practiced without those specifically defined matters. Also, well-known functions or constructions are not described in detail since they would obscure the description with unnecessary detail.

FIG. 1 is a diagram illustrating an example of an apparatus for receiving an image by tracking an object according to an exemplary embodiment.

An apparatus 100 for receiving (or capturing) an image by tracking an object may receive an image generated by capturing an area external to the apparatus 100. The apparatus 100 may include a mobile terminal, for example, a smartphone, a tablet personal computer (PC), and a laptop computer. An image receiver (or image capturing device) 120 of the apparatus 100 may be configured to rotate relative to a body 110. The apparatus 100 may track a movement of an object 190 and rotate the image receiver 120 such that a focus orientation 101 of the image receiver 120 is towards the object 190. Here, the focus orientation 101 may be based on a direction in which the image receiver 120 captures an image, and also be referred to as, for example, a camera orientation. The object 190 may be a target, for example, things, people, and animals to be captured, excluding a background.

The apparatus 100 may acquire an image of the object 190 by tracking a movement of the object 190 using the image receiver 120 and continuously capturing the object 190. However, the disclosure is not limited thereto. The apparatus 100 may acquire a still image of the object 190 by detecting a position of the object 190 and rotating the image receiver 120 to capture the object 190. Also, the apparatus 100 may acquire a panorama image by rotating the image receiver 120 by 360 degrees, for example, under a control of the apparatus 100 or a user.

In an example, the image receiver 120 of the apparatus 100 may be rotatable. Thus, the apparatus 100 may automatically rotate the image receiver 120 and the user may not need to manually rotate the apparatus 100. In addition, the apparatus 100 may automatically track the object 190 to acquire an image of the object 190 and the user may not need to manually move the apparatus 100. Also, the apparatus 100 may rotate the image receiver 120 without using additional equipment, e.g., a camera platform.

Figure 2:
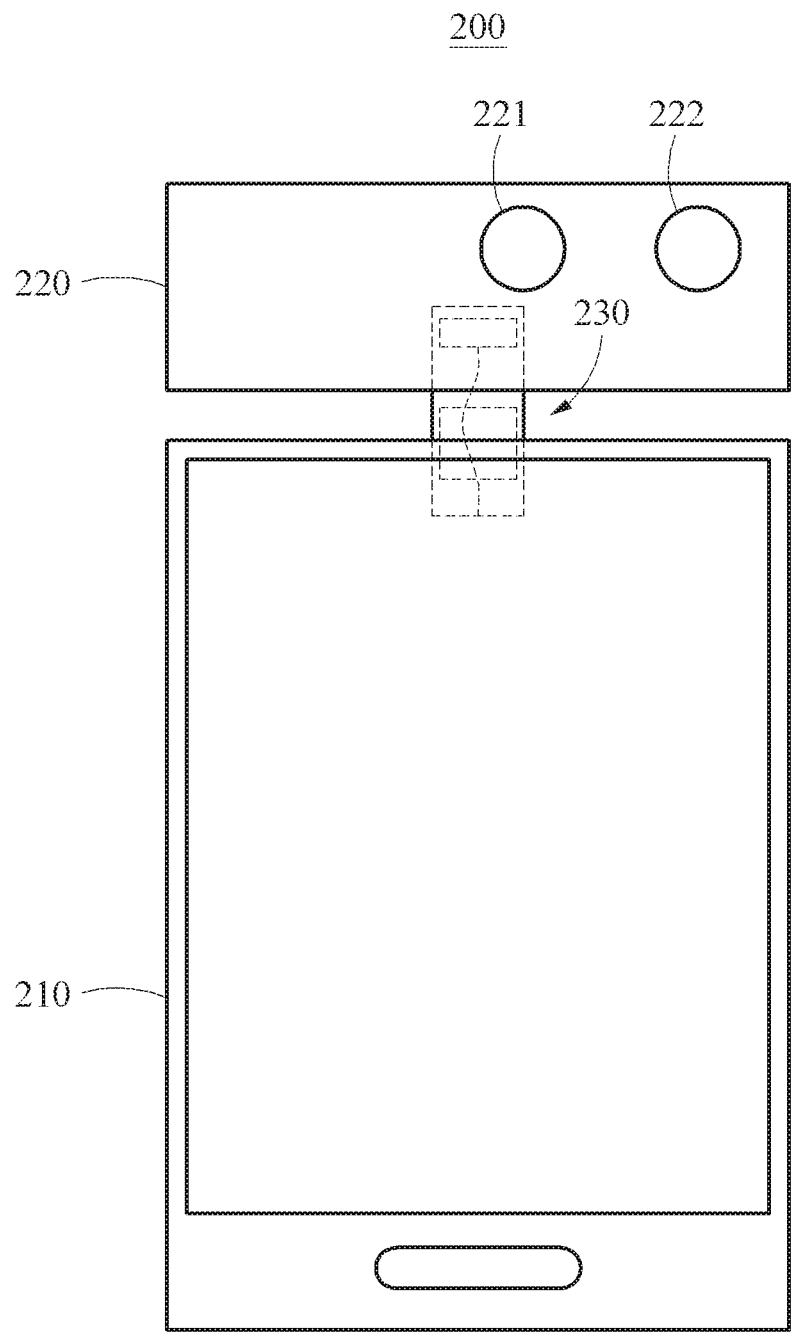
FIG. 2 is a diagram illustrating an apparatus for receiving an image by tracking an object according to another exemplary embodiment.

FIG. 2 is a diagram illustrating an apparatus for receiving an image by tracking an object according to another exemplary embodiment.

An apparatus 200 for receiving an image by tracking an object according to another exemplary embodiment may include a body 210, an image receiver 220, and a connector 230.

The body 210 may support the image receiver 220 through the connector 230. The body 210 of the apparatus 200 may include one or more components that are used to perform various functions of the apparatus 200. The body 210 may include, for example, a display, an input button, a touch sensor, a communication module, and a processor. A configuration and a function of the body 210 are not limited to the foregoing examples.

The image receiver 220 may receive an image of an area external to the apparatus 200. Referring to FIG. 2, the image receiver 220 may include a camera 221 configured to receive (or capture) the image of the area and a motion sensor 222 configured to generate position information. In this example, the motion sensor 222 may detect a position of an object relative to the apparatus 200 and generate position information. The motion sensor 222 may generate the position information of the object based on an image received through an image sensor, which will be described later with reference to FIG. 6.

A method of generating the position information of the object is not limited to the foregoing example. The image receiver 220 may analyze the image received through the camera 221 of the image receiver 220, track a movement of the object appearing in the image, and generate the position information of the object based on the tracked movement without employing the motion sensor 222. In this case, the motion sensor 222 may be omitted from the apparatus 200.

The position information may be information associated with a position of the object relative to a position of the apparatus 200 as a reference, for example, an origin. The position information may include, for example, relative coordinates of the object based on coordinates of the apparatus 200 as an origin.

Also, the image receiver 220 may be detachably attached to the body 210. For example, the user may use the image receiver 220 interchangeably with a camera that provides a desired level of performance.

The connector 230 may rotatably connect the image receiver 220 to the body 210 and rotate the image receiver 220 based on position information of an object relative to the apparatus 200. For example, the connector 230 may support the image receiver 220 based on a rotatable structure relative to the body 210.

In an example, the connector 230 may include a mechanical structure having a rotation axis to two-dimensionally rotate the image receiver 220. For example, the connector 230 may rotate the image receiver 220 in a clockwise direction or a counterclockwise direction based on a yaw axis as described with reference to FIG. 8. A type of the mechanical structure is not limited to the aforementioned example. The connector 230 may also include a mechanical structure having at least two rotation axes, for example, at least two axes among a rolling axis, a pitch axis, and the yaw axis to three-dimensionally rotate the image receiver 220. The following descriptions are provided based on the connector 230 configured to support the image receiver 220 to be rotatable relative to the body 210 based on the yaw axis as an example.

As illustrated in FIG. 2, the apparatus 200 may be implemented as a mobile terminal. Also, the body 210 and the image receiver 220 may be separate from each other in the apparatus 200. The image receiver 220 may include the camera 221 and the motion sensor 222. Because the image receiver 220 is separate from the body 210, the image receiver 220 may easily change a direction.

Figure 3:
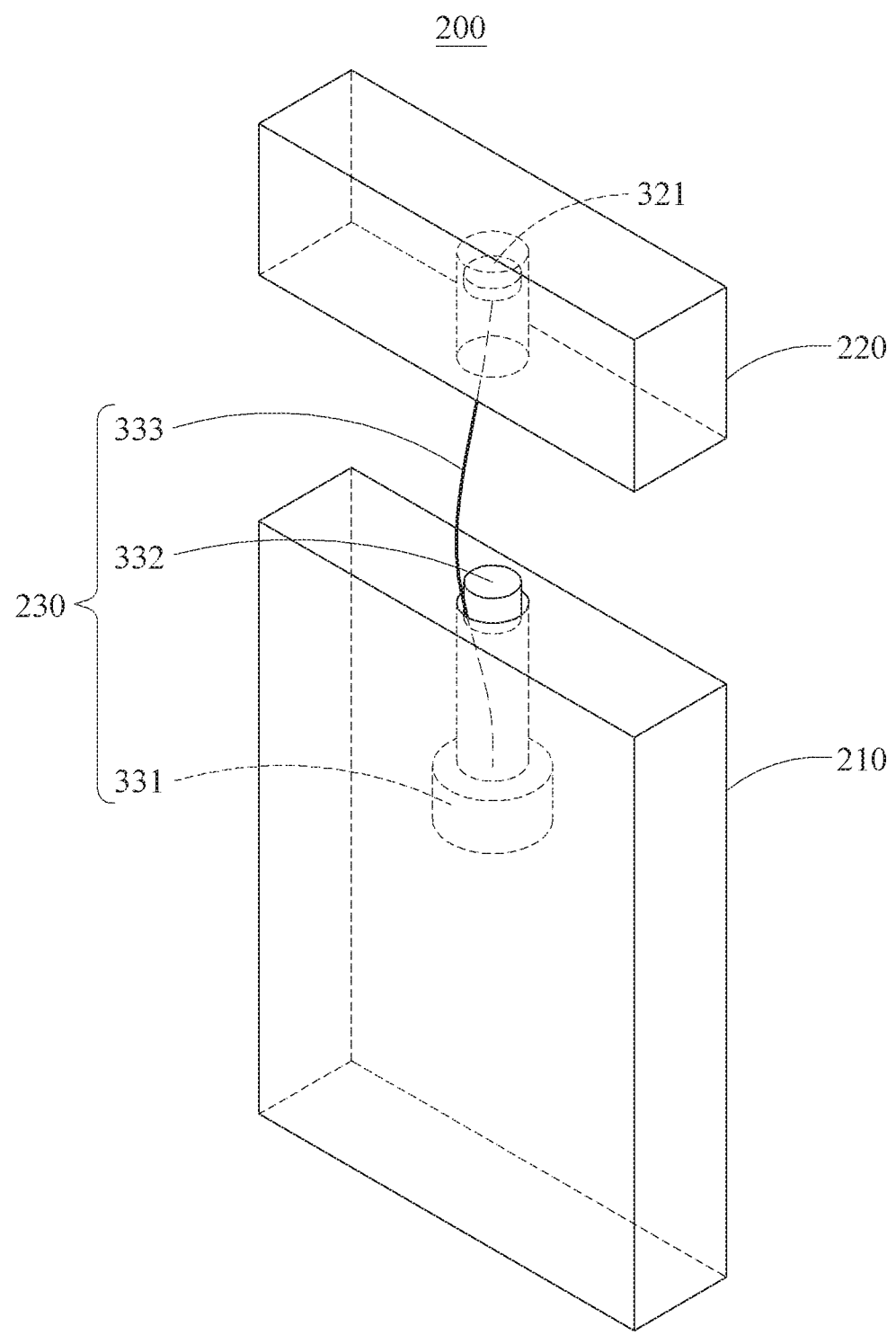
FIGS. 3 and 4 are diagrams illustrating a connector in an apparatus for receiving an image by tracking an object according to exemplary embodiments.
Figure 4:
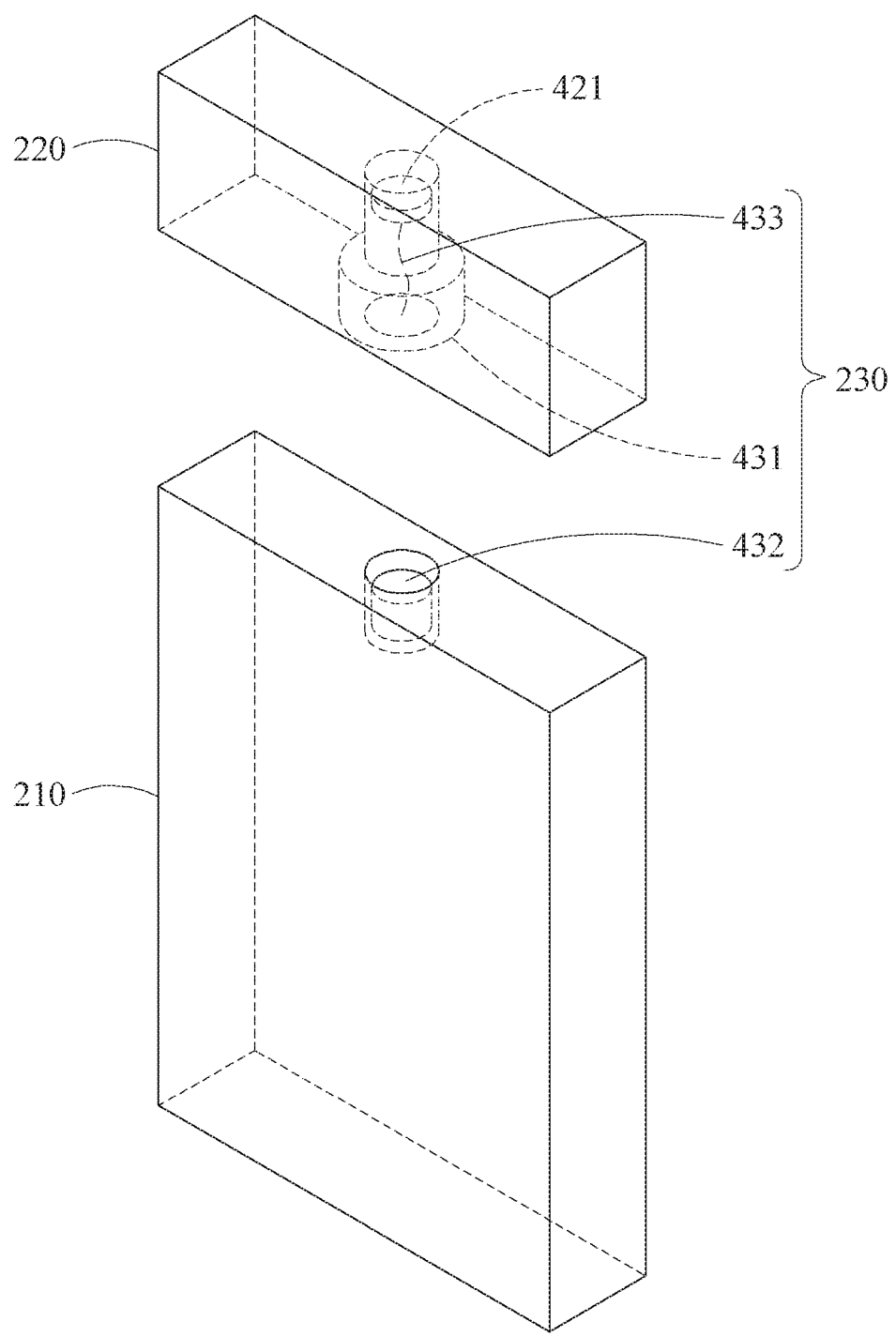

FIGS. 3 and 4 are diagrams illustrating a connector in an apparatus for receiving an image by tracking an object according to exemplary embodiments. The same reference numerals are used to denote the same elements and a repetitive description thereof is not provided.

Referring to FIG. 3, a rotational motor 331 may be included in the body 210 of the apparatus 200. The connector 230 may include the rotational motor 331, a connecting structure 332, and a connecting line 333 and connect the image receiver 220 and the body 210. In FIG. 3, a motion sensor 321 may be included in the image receiver 220. The rotational motor 331 may be included in the body 210. The connecting line 333 may be used to connect the motion sensor 321 and the rotational motor 331. A hole may be formed on each of the image receiver 220 and the body 210. Through the hole, the connecting line 333 may connect the motion sensor 321 and the rotational motor 331.

The connector 230 may generate the position information based on the movement of the object sensed by the motion sensor 321. Based on the position information, the connector 230 may transfer a control signal to the rotational motor 331 to control the rotational motor 331. For example, the connector 230 may transfer the control signal to the rotational motor 331 by using the connecting line 333 that passes through the connecting structure 332. The rotational motor 331 may rotate based on the movement of the object. The image receiver 220 may also automatically or manually rotate in a state in which the body 210 is fixed such that a focus orientation of a camera, for example, included in the image receiver 220 is towards the object. In an example of FIG. 3, the image receiver 220 of the apparatus 200 may not include the rotational motor 331, thereby achieving simplicity and lightness in a structure of the image receiver 220.

Referring to FIG. 4, a rotational motor 431 may be included in the image receiver 220 of the apparatus 200. In an example of FIG. 4, a motion sensor 421 and the rotational motor 431 may be included in the image receiver 220. Also, a connecting structure 432 may be used to connect the image receiver 220 and the body 210. In this example, the connecting structure 432 may include, for example, a rotatable mechanical structure. Similarly to FIG. 3, the rotational motor 431 may receive a control signal through a connecting line 433 based on a movement of an object sensed by the motion sensor 421. The rotational motor 431 may rotate the image receiver 220 relative to the body 210 through the connecting structure 432. In an example of FIG. 4, the image receiver 220 of the apparatus 200 may include the rotational motor 431. Thus, a length of the connecting line 433 connecting the motion sensor 421 and the rotational motor 431 may be reduced.

Figure 5:
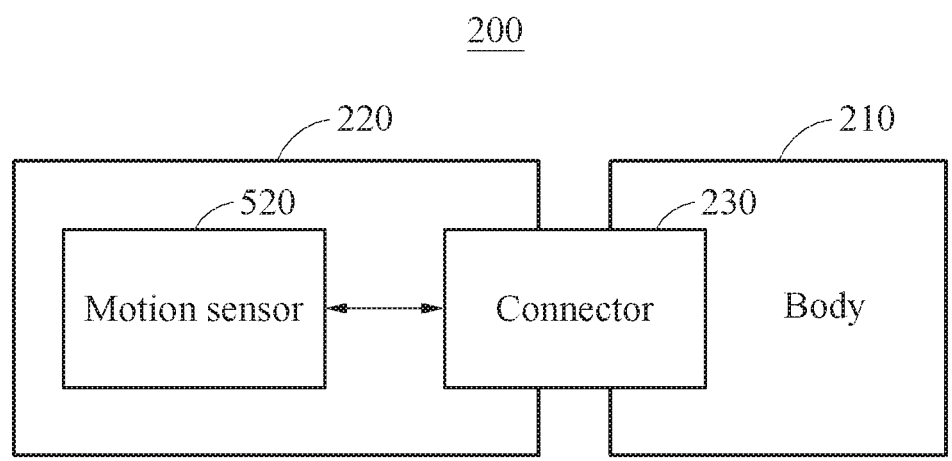
FIGS. 5 through 7 are block diagrams illustrating an apparatus for receiving an image by tracking an object according to exemplary embodiments.
Figure 6:
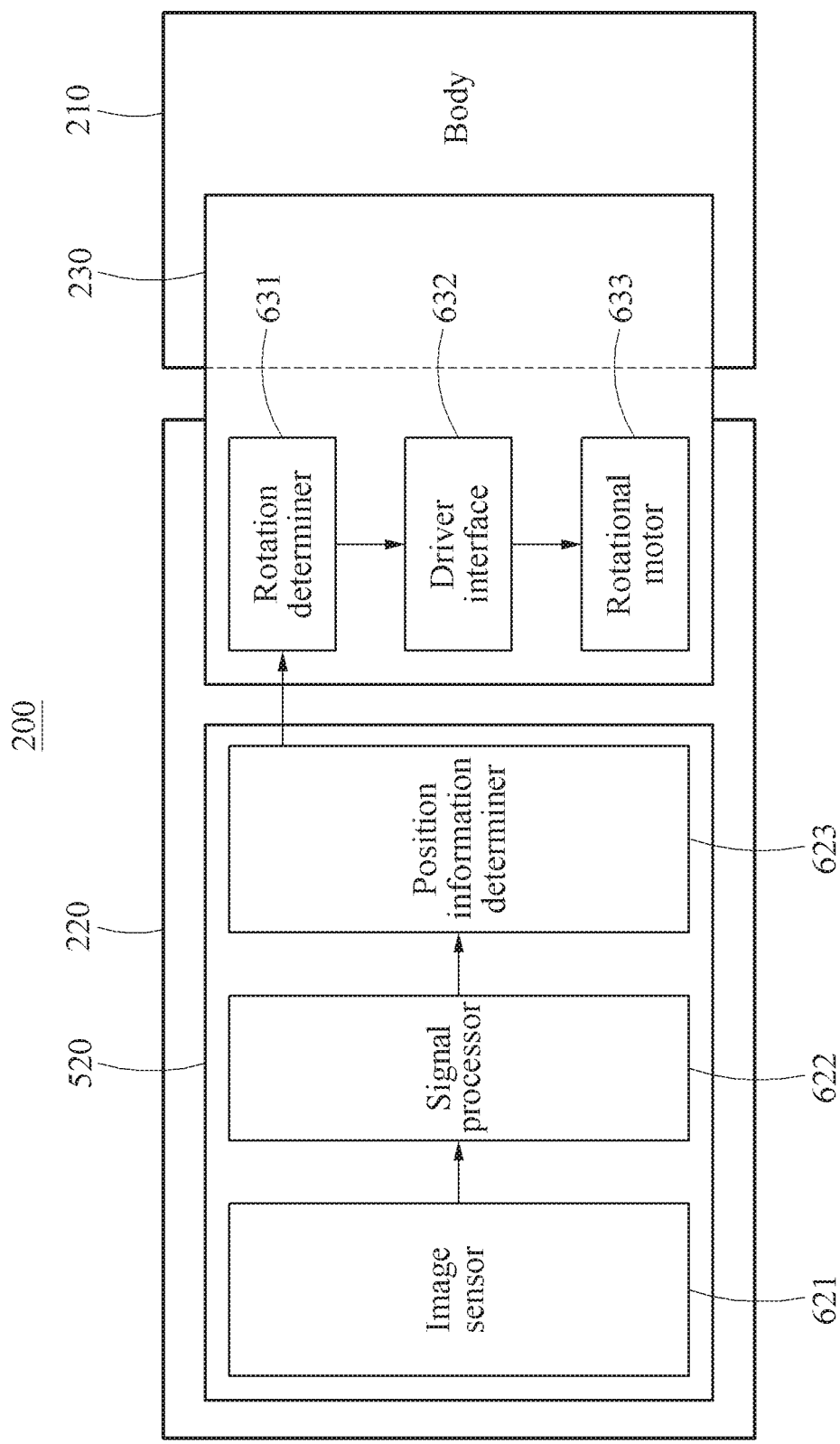
Figure 7:
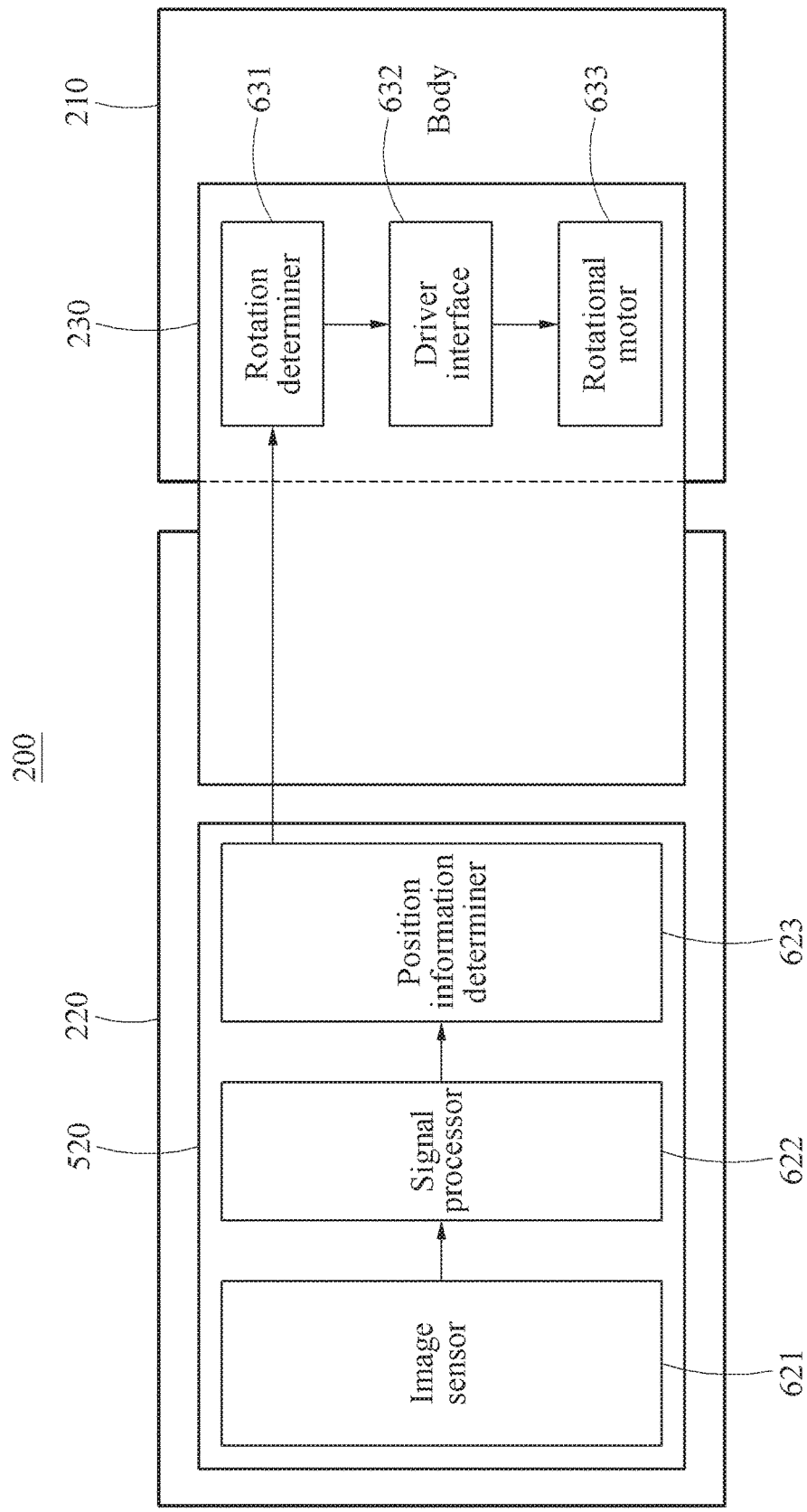

FIGS. 5 through 7 are block diagrams illustrating an apparatus for receiving an image by tracking an object according to exemplary embodiments. The same reference numerals are used to denote the same elements and a repetitive description thereof is not provided.

FIG. 5 is a block diagram illustrating an example of an apparatus for receiving an image by tracking an object according to an exemplary embodiment. The apparatus 200 may include the body 210, the image receiver 220, and the connector 230. The image receiver 220 may include a motion sensor 520. Although not shown in FIG. 5, the image receiver 220 may further include a camera. Referring to FIG. 5, the motion sensor 520 may detect position information of an object and transfer the position information to the connector 230.

Referring to FIG. 6, a rotational motor 633 of the connector 230 may be included in the image receiver 220. Referring to FIG. 7, the rotational motor 633 of the connector 230 may be included in the body 210. As illustrated in FIGS. 6-7, the image receiver 220 may include the motion sensor 520.

The motion sensor 520 may include the image sensor 621, a signal processor 622, and a position information determiner 623. At least one or more components of the motion sensor 520 may be implemented by using a hardware processor, e.g., a central processing unit (CPU). The motion sensor 520 may operate as a controller that controls an operation of the apparatus 200.

The image sensor 621 may receive at least one of a color image, a black and white image, a depth image, or an event image. The color image may include, for example, a red, green and blue (RGB) image and a YCbCr image. A type of color image is not limited the aforementioned images and thus, the color image may also indicate an image based on other color spaces. The black and white image may be, for example, a grayscale image. The depth image may include an image that represents a distance between the apparatus 200 and an object. Each pixel of the depth image may have a depth value. The event image may include an image acquired through an event-based vision sensor configured to non-time-synchronously output an event signal, for example, a signal indicating whether a motion of an object is detected in pixels, by sensing a change in an intensity of light. The event-based vision sensor may be, for example, included in the image sensor 621. The event image may also include an image expressed by accumulating event signals output based on the movement of the object for a predetermined time interval.

FIG. 6 illustrates that the motion sensor 520 includes the image sensor 621 as an example, and a type of a sensor to be included in the motion sensor 520 is not limited to the example. Thus, the motion sensor 520 may include any type of a sensor configured to receive information indicating a change in a position of an object.

The signal processor 622 may process the received image. The signal processor 622 may process at least one of the received color image, black and white image, depth image, and event image through, for example, a noise removal, an edge enhancement, and filtering of a predetermined frequency component. An image processing technique is not limited to the aforementioned examples and thus, various image processing techniques may be performed.

The position information determiner 623 may generate location information (or position information) of the object based on the processed image. For example, the position information determiner 623 may extract the object from the processed image and extract a motion vector and/or an optical flow, thereby tracking the movement of the object. The position information determiner 623 may determine a position of the object based on the tracked movement. Here, the position of the object may be, for example, relative coordinates of the object based on coordinates of the apparatus 200 as an origin. However, not limited to this, the position information determiner 623 may estimate the position of the object by extracting the object from the image.

The connector 230 may include a rotation determiner 631, a driver interface 632, and the rotational motor 633.

The rotation determiner 631 may determine rotation information of the image receiver 220 based on the position information generated by the position information determiner 623. Based on the position information of the object and a focus orientation of the image receiver 220, the rotation determiner 631 may determine a direction in which the image receiver 220 rotates, for example, a clockwise direction or a counterclockwise direction, a rotation angle, and a rotation speed as the rotation information.

The driver interface 632 may control the rotational motor 633 to be driven based on the rotation information. For example, the driver interface 632 may generate a control signal to control the rotational motor 633 based on the rotation information and control the rotational motor 633 based on the control signal.

The rotational motor 633 may rotate the image receiver 220 in response to the control signal of the driver interface 632.

In an example of FIG. 6, the rotation determiner 631, the driver interface 632, and the rotational motor 633 of the connector 230 may be positioned on the image receiver 220. In an example of FIG. 7, the rotation determiner 631, the driver interface 632, and the rotational motor 633 of the connector 230 may be positioned in the body 210.

Figure 8:
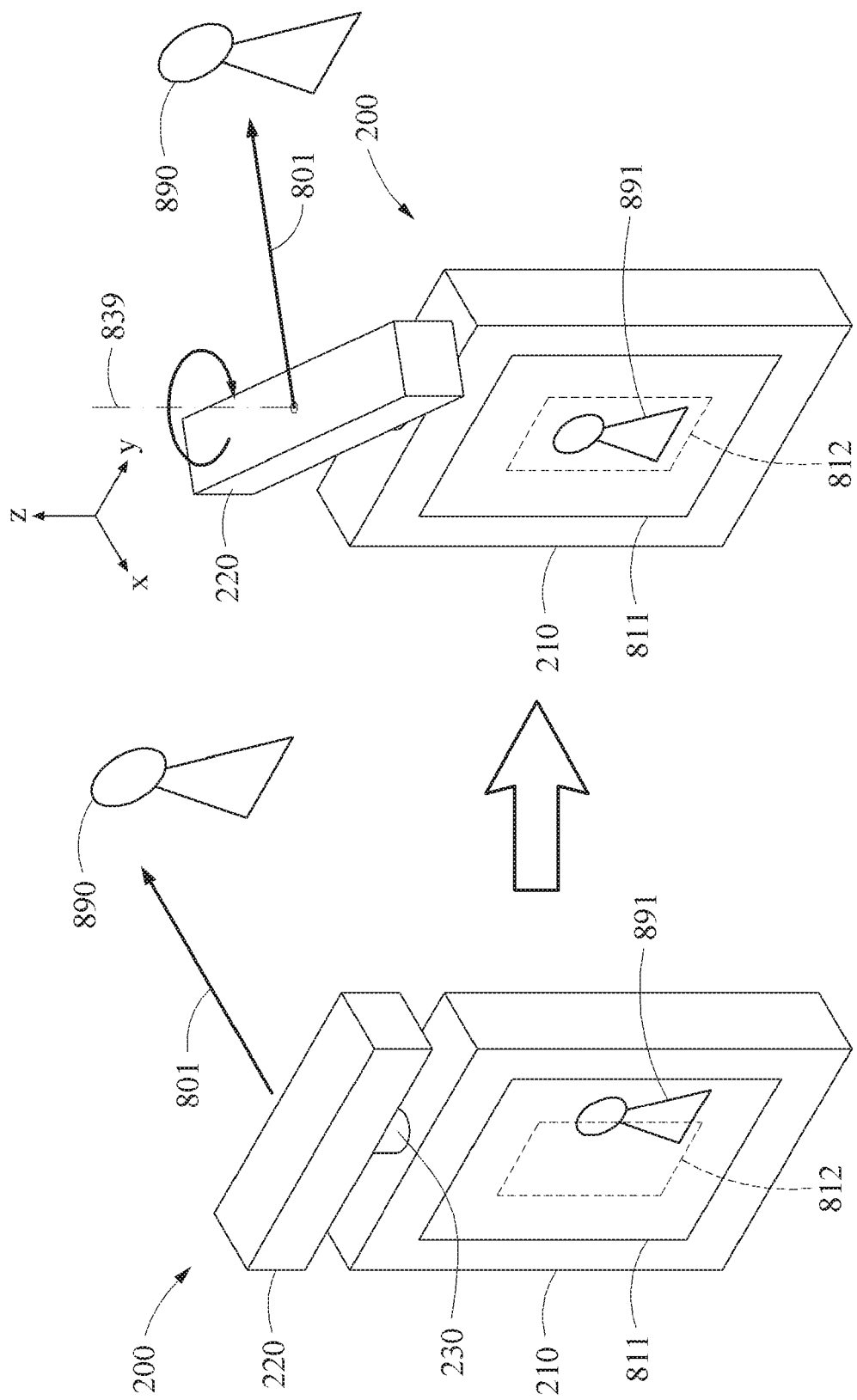
FIG. 8 is a diagram illustrating an example of receiving an image by tracking an object according to an exemplary embodiment.

FIG. 8 is a diagram illustrating an example of receiving an image by tracking an object according to an exemplary embodiment.

Referring to FIG. 8, an object 890 may be positioned on a side from a focus orientation 810. The connector 230 of the apparatus 200 for receiving an image by tracking an object may generate position information and rotate the image receiver 220 in a direction corresponding to a position of the object 890. Similarly to the example of FIG. 1, in response to a movement of the object 890, the image receiver 220 may continuously track the movement of the object 890. Also, the connector 230 may rotate the image receiver 220 such that the focus orientation 801 of the image receiver 220 is towards the position of the object 890.

In an example, the connector 230 may rotate the image receiver 220 based on the position information such that the focus orientation 801 of the image receiver 220 is towards the object 890. For example, the connector 230 may rotate the image receiver 220 such that an image of the object 890 is positioned in a predetermined region 812 on a screen 811 or an image to be captured. The predetermined region 812 may be, for example, a region corresponding to a center portion of the screen 811.

As illustrated in FIG. 8, the object 890 may be located on a right side of the apparatus 200. In this example, an object 891 may be displayed on an edge portion of the screen 811. Here, an image 891 of the object 890 may be represented on the screen 811. The apparatus 200 may rotate the image receiver 220 through the connector 230 to control the image receiver 220 such that the focus orientation 801 is towards the object 890. In this manner, the apparatus 200 may arrange an image of the object 891 to be in the predetermined region 812, for example, a central portion of the screen 811. When the focus orientation 801 corresponds to a position of the object 890, the object 891 may be displayed on the predetermined region 812 of the screen 811.

FIG. 8 illustrates the object 890 as a single object although the number of objects is not limited thereto. When at least one object is present, the apparatus 200 may select one of the at least one object. For example, the apparatus 200 may receive an input, for example, a touch input to select one of a plurality of objects displayed on the screen 811. In this example, the apparatus 200 may determine an object to be displayed on a predetermined region on the screen 811 based on the received touch input on the screen 811. Based on the position information generated with respect to the object 890 selected by the user, the connector 230 may rotate the image receiver 220 such that the focus orientation 801 of the image receiver 220 is towards the object 890 selected by the user. When a single object is present, the apparatus 200 may receive an input to select the object 890 from the user and rotate the image receiver 220 to be focused on the object 890. Alternatively, when a single object is present, the apparatus 200 may control the image receiver 220 without receiving an input from the user.

Although the aforementioned example describes that the object is selected in the area based on the touch input on the screen 811, a method of selecting an object according to exemplary embodiments is not limited to the example. The apparatus 200 for receiving an image by tracking an object may select an object based on a predetermined reference, for example, an object having a greatest motion. Also, the apparatus 200 may manually select an object in response to various types of inputs received from a user, or automatically select an object based on various references.

FIG. 8 illustrates the connector 230 having a rotation axis, for example but not limited to, a yaw axis 839. The connector 230 may include a mechanical structure having at least two rotation axes, for example, a rolling axis and a pitch axis in addition to the yaw axis 839 to three-dimensionally rotate the image receiver 220.

Also, the apparatus 200 may generate a panorama image using the connector 230 in a rotatable form while the body 210 is in a fixed state. When a panorama image input, for example, an input requesting the apparatus 200 to capture a panorama image is received from the user, the connector 230 may rotate the image receiver 220 by 360 degrees based on the yaw axis 839. The image receiver 220 may generate the panorama image based on images received (or captured) while rotating based on the yaw axis 839.

Figure 9:
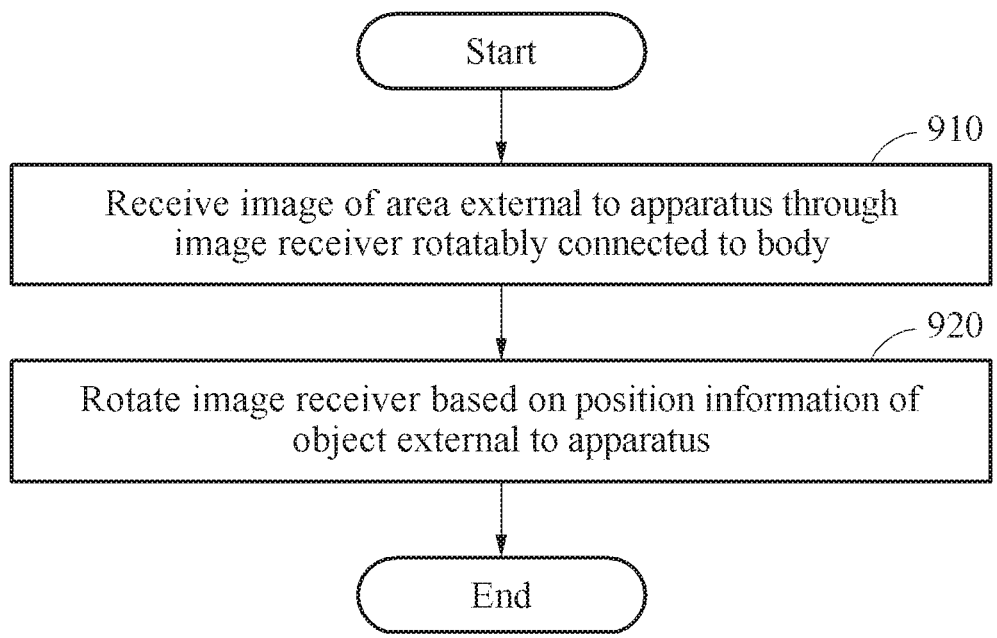
FIG. 9 is a flowchart illustrating a method of receiving an image by tracking an object according to an exemplary embodiment.

FIG. 9 is a flowchart illustrating a method of receiving an image by tracking an object according to an exemplary embodiment.

In operation 910, an apparatus for receiving an image by tracking an object according to an exemplary embodiment may receive an image of an area external to the apparatus through an image receiver rotatably connected to a body of the apparatus.

In operation 920, a connector may rotate the image receiver based on position information of the object.

Descriptions related to an apparatus for receiving an image by tracking an object provided with reference to FIGS. 1 through 8 are applicable to the method of receiving an image by tracking an object.

An apparatus for receiving an image by tracking an object according to exemplary embodiments may track a movement of an object of interest of a user and capture an image such that the object is represented in a predetermined portion of a screen. In this manner, a user convenience may be improved.

Also, an apparatus for receiving an image by tracking an object according to exemplary embodiments may automatically capture a panorama image. While rotating an image receiver of the apparatus of which a body is fixed to a predetermined position, the apparatus may repetitively capture an image (e.g., a bust shot), for example, at preset time intervals, thereby acquiring a 360° view of an area surrounding the apparatus.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or may be of the well-known kind and available to those having ordinary skill in the computer software arts. Examples of non-transitory computer-readable media include magnetic media such as hard disks, floppy disks, and magnetic tape; optical media such as compact disc read only memories (CD ROMs) and digital versatile discs (DVDs); magneto-optical media such as optical discs; and hardware devices that are specially configured to store and perform program instructions, such as a read-only memory (ROM), a random access memory (RAM), a flash memory, and the like. The media may be transfer media such as optical lines, metal lines, or waveguides including a carrier wave to transmit a signal designating the program command and the data construction. Examples of program instructions include both machine code, such as code produced by a compiler, and files containing higher level code that may be executed by the computer using an interpreter. The described hardware devices may be configured to act as one or more software modules to perform the operations of the above-described exemplary embodiments, or vice versa.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for capturing an image, the apparatus comprising:
  a body;
  an image capturing device configured to capture an image comprising one or more objects, the image capturing device comprising a motion sensor configured to detect a position of the one or more objects relative to the apparatus and generate position information of the one or more objects; and
  a connector configured to:
    rotatably connect the image capturing device to the body;
    receive selection, based on a user input, of an object from the one or more objects included in the captured image; and
    rotate the image capturing device based on position information of the selected object,
    wherein the selected object is positioned in a predetermined region of the captured image.

2. The apparatus of claim 1, wherein the motion sensor comprises:
  an image sensor configured to capture at least one of a color image, a black and white image, a depth image, and an event image;

a signal processor configured to perform an image processing on the captured image; and a position information determiner configured to generate the position information based on the image on which the image processing is performed.

3. The apparatus of claim 1, wherein the image capturing device is further configured to track a movement of the one or more objects by analyzing the captured image, and generate the position information based on the tracked movement.

4. The apparatus of claim 1, wherein the connector is further configured to rotate the image capturing device based on the position information such that an orientation of a focus of the image capturing device is towards the selected object.

5. The apparatus of claim 4, wherein the connector is further configured to rotate the image capturing device automatically or in response to a user input.

6. The apparatus of claim 1, wherein the connector is further configured to rotate the image capturing device such that, when an image including the selected object is captured, the selected object is positioned in a predetermined region of the captured image including the object.

7. The apparatus of claim 1, wherein the connector has a mechanical structure having at least two rotation axes to three-dimensionally rotate the image capturing device.

8. The apparatus of claim 1, wherein the connector comprises:
a rotation determiner configured to determine whether to rotate the image capturing device based on the position information;
a driver interface configured to control a rotational motor based on a result of determination of the rotation information; and
the rotational motor configured to rotate the image capturing device under a control of the driver interface.

9. The apparatus of claim 1, wherein the connector is further configured to rotate the image capturing device by 360 degrees based on a yaw axis when an input to generate a panorama image is received, and
the image capturing device is further configured to generate the panorama image based on an image captured while rotating based on the yaw axis.

10. A method of capturing an image by using an image capturing apparatus, the method comprising:
capturing an image of an area by using an image capturing device rotatably connected to a body of the image capturing apparatus;
selecting, based on a user input to the body, an object from one or more objects included in the captured image;
generating, by a motion sensor included in the image capturing device, position information by detecting a position of the selected object relative to the image capturing apparatus; and
rotating the image capturing device based on the position information of the selected object such that the selected object is positioned in a predetermined region of the captured image.

11. The method of claim 10, wherein the generating comprises:
capturing at least one of a color image, a black and white image, a depth image, and an event image;
performing an image processing on the captured image; and
generating the position information based on an image obtained through the image processing.

12. The method of claim 10, wherein the capturing comprises:
tracking a movement of the one or more objects by analyzing the captured image; and
generating the position information based on the tracked movement.

13. The method of claim 10, wherein the rotating comprises rotating the image capturing device based on the position information such that an orientation of a focus of the image capturing device is towards the selected object.

14. The method of claim 10, wherein the rotating comprises rotating the image capturing device such that, when an image including the selected object is captured, the object is positioned in a predetermined region of the captured image of the selected object.

15. The method of claim 10, wherein the rotating comprises three-dimensionally rotating the image capturing device by using a mechanical structure having at least two rotation axes.

16. The method of claim 10, wherein the rotating comprises:
determining rotation information of the image capturing device based on the position information; and
controlling a rotational motor to be driven based on the rotation information.

17. A non-transitory computer-readable storage medium storing a program which, when executed by a computer, causes the computer to implement the method of claim 10.

18. An apparatus for capturing an image, the apparatus comprising:
an image capturing device comprising:
a camera to capture an image comprising one or more objects; and
a motion sensor to detect a position of the one or more objects relative to the apparatus and generate position information of the one or more objects; and
a controller configured to control a position of the camera based on the detected position of the one or more objects,
wherein the controller is further configured to receive selection, based on a user input, of an object from the one or more objects included in the captured image, and rotate the image capturing device based on position information of the selected object,
wherein the selected object is positioned in a predetermined region of the captured image.

19. The apparatus of claim 18, wherein the camera is rotatably connected to a body of the apparatus, and the controller is further configured to rotate the camera based on the position of the selected object such that an orientation of a focus of the camera is towards the selected object.

20. The apparatus of claim 18, further comprising a motor configured to rotate the camera under a control of the controller.

21. The apparatus of claim 18, wherein the controller is further configured to detect the position of the one or more objects by analyzing an image of the one or more objects captured by the camera.

* * * * *